(12) United States Patent
Krakirian et al.

(10) Patent No.: US 7,715,400 B1
(45) Date of Patent: May 11, 2010

(54) NODE IDENTIFICATION FOR DISTRIBUTED SHARED MEMORY SYSTEM

(75) Inventors: Shahe Hagop Krakirian, Palo Alto, CA (US); Isam Akkawi, Aptos, CA (US)

(73) Assignee: 3 Leaf Networks, Santa Clara, CA (US)

( * ) Notice: Subject to any disclaimer, the term of this patent is extended or adjusted under 35 U.S.C. 154(b) by 565 days.

(21) Appl. No.: 11/740,432

(22) Filed: Apr. 26, 2007

(51) Int. Cl.
*H04L 12/28* (2006.01)
(52) U.S. Cl. .................. 370/392; 370/389; 711/147; 711/141
(58) Field of Classification Search ............... None
See application file for complete search history.

(56) References Cited

U.S. PATENT DOCUMENTS

| | | | |
|---|---|---|---|
| 6,757,790 B2 * | 6/2004 | Chalmer et al. ............ | 711/147 |
| 6,877,030 B2 | 4/2005 | Deneroff | |
| 2001/0037435 A1 * | 11/2001 | Van Doren ................. | 711/153 |
| 2003/0076831 A1 * | 4/2003 | Van Doren et al. ......... | 370/394 |
| 2004/0148472 A1 * | 7/2004 | Barroso et al. ............. | 711/141 |

* cited by examiner

*Primary Examiner*—Duc C Ho
(74) *Attorney, Agent, or Firm*—Baker Botts L.L.P.

(57) ABSTRACT

An example embodiment of the present invention provides processes relating to a connection/communication protocol and a memory-addressing scheme for a distributed shared memory system. In the example embodiment, a logical node identifier comprises bits in the physical memory addresses used by the distributed shared memory system. Processes in the embodiment include logical node identifiers in packets which conform to the protocol and which are stored in a connection control block in local memory. By matching the logical node identifiers in a packet against the logical node identifiers in the connection control block, the processes ensure reliable delivery of packet data. Further, in the example embodiment, the logical node identifiers are used to create a virtual server consisting of multiple nodes in the distributed shared memory system.

15 Claims, 13 Drawing Sheets

| DWORD | 31 | 30 | 29 | 28 | 27 | 26 | 25 | 24 | 23 | 22 | 21 | 20 | 19 | 18 | 17 | 16 | 15 14 13 12 11 10 9 8 7 6 5 4 3 2 1 0 |
|---|---|---|---|---|---|---|---|---|---|---|---|---|---|---|---|---|---|
| 0 | PS | Reserved | | | | | | | FAIL STAT | | | | DOWN STAT | | | | MY_LNID |
| 1 | Reserved |||||||||||||||||
| 2 | Path 0 Middle Fabric Address |||||||||||||||| Path 0 Low Fabric Address |
| 3 | VDT | PT | TMR SEL || Reserved |||||||||||| Path 0 High Fabric Address |
| 4 | Path 1 Middle Fabric Address |||||||||||||||| Path 1 Low Fabric Address |
| 5 | VDT | PT | TMR SEL || Reserved |||||||||||| Path 1 High Fabric Address |
| 6 | Reserved |||||||||||||||||
| 7 |  |||||||||||||||||
| 8 | Transmit Replay Buffer Head and Tail Pointers for VC0 |||||||||||||||||
| 9 | Transmit Replay Buffer Head and Tail Pointers for VC0 |||||||||||||||||
| 10 | Transmit Replay Buffer Head and Tail Pointers for VC1 |||||||||||||||||
| 11 | Transmit Replay Buffer Head and Tail Pointers for VC1 |||||||||||||||||
| 12 | Transmit Replay Buffer Head and Tail Pointers for VC2 |||||||||||||||||
| 13 | Transmit Replay Buffer Head and Tail Pointers for VC2 |||||||||||||||||
| 14 | Transmit Replay Buffer Head and Tail Pointers for VC3 |||||||||||||||||
| 15 | Transmit Replay Buffer Head and Tail Pointers for VC3 |||||||||||||||||
| 16 | Send Sequence Number for VC1 |||||||||||||||| Send Sequence Number for VC0 |
| 17 | Send Sequence Number for VC3 |||||||||||||||| Send Sequence Number for VC2 |
| 18 | Expected Sequence Number for VC1 |||||||||||||||| Expected Sequence Number for VC0 |
| 19 | Expected Sequence Number for VC3 |||||||||||||||| Expected Sequence Number for VC2 |
| 20 | Transmitted Packet Count for VC0 |||||||||||||||||
| 21 | Transmitted Packet Count for VC1 |||||||||||||||||
| 22 | Transmitted Packet Count for VC2 |||||||||||||||||
| 23 | Transmitted Packet Count for VC3 |||||||||||||||||
| 24 | Received Packet Count for VC0 |||||||||||||||||
| 25 | Received Packet Count for VC1 |||||||||||||||||
| 26 | Received Packet Count for VC2 |||||||||||||||||
| 27 | Received Packet Count for VC3 |||||||||||||||||
| 28 | Replayed Packet Count for VC1 |||||||||||||||| Replayed Packet Count for VC0 |
| 29 | Replayed Packet Count for VC3 |||||||||||||||| Replayed Packet Count for VC2 |
| 30 | Received Send SN Error Count |||||||||||||||| Received ECRC Error Count |
| 31 | Reserved |||||||||||||||||

NODE IDENTIFICATION FOR DISTRIBUTED SHARED MEMORY SYSTEM

CROSS-REFERENCE TO RELATED APPLICATIONS

This application is related to the following commonly-owned U.S. utility patent application, filed on Jan. 29, 2007, whose disclosure is incorporated herein by reference in its entirety for all purposes: U.S. patent application Ser. No. 11/668,275, entitled "Fast Invalidation for Cache Coherency in Distributed Shared Memory System".

TECHNICAL FIELD

The present disclosure relates to an identification process for the nodes in a distributed shared memory system.

BACKGROUND

A distributed shared memory (DSM) is a multiprocessor system in which the processors in the system are connected by a scalable interconnect, such as an InfiniBand switched fabric communications link, instead of a bus. DSM systems present a single memory image to the user, but the memory is physically distributed at the hardware level. Typically, each processor has access to a large shared global memory in addition to a limited local memory, which might be used as a component of the large shared global memory and also as a cache for the large shared global memory. Naturally, each processor will access the limited local memory associated with the processor much faster than the large shared global memory associated with other processors. This discrepancy in access time is called non-uniform memory access (NUMA).

A major technical challenge in DSM systems is ensuring that the each processor's memory cache is consistent with each other processor's memory cache. Such consistency is called cache coherence. To maintain cache coherence in larger distributed systems, additional hardware logic (e.g., a chipset) or software is used to implement a coherence protocol, typically directory-based, chosen in accordance with a data consistency model, such as strict consistency. DSM systems that maintain cache coherence are called cache-coherent NUMA (ccNUMA).

Typically, if additional hardware logic is used, a node in the system will comprise a chip that includes the hardware logic and one or more processors and will be connected to the other nodes by the scalable interconnect. For purposes of initial connection and later communication between nodes, the system might employ node identifiers, e.g., serial, random, or centrally-assigned numbers, which in turn might be used as part of an address for physical memory residing on the node.

SUMMARY

In particular embodiments, the present invention provides methods, apparatuses, and systems directed to node identification in a DSM system. In one particular embodiment, the present invention provides node-identification processes for use with a connection/communication protocol and a memory-addressing scheme in a DSM system.

DESCRIPTION OF THE DRAWINGS

FIG. 6 is a diagram showing the format of a connection control block, which format might be used in some embodiments of the present invention.

DESCRIPTION OF EXAMPLE EMBODIMENT(S)

The following example embodiments are described and illustrated in conjunction with apparatuses, methods, and systems which are meant to be examples and illustrative, not limiting in scope.

A. ccNUMA DMA System with DSM-Management Chips

A DSM system has been developed that provides cache-coherent non-uniform memory access (ccNUMA) through the use of a DSM-management chip. In a particular embodiment, a DSM system may comprise a distributed computer network of up to 16 nodes, connected by a switched fabric, where each node includes two or more Opteron CPUs and one DSM-management chip. In another embodiment, this DSM system comprises up to 256 nodes connected by the switched fabric.

The DSM system allows the creation of a multi-node virtual server which is a virtual machine consisting of multiple CPUs belonging to two or more nodes. In some embodiments, the nodes use a connection/communication protocol to communicate with each other and with virtual I/O servers in the DSM system. Enforcement of the connection/communication protocol is also handled by the DSM-management chip. Consequently, virtual I/O servers include a DSM-management chip, though they do not contribute any physical memory to the DSM system and consequently do not make use of the chip's functionality directly related to cache coherence, in particular embodiments. For a further description of a virtual I/O server, see U.S. patent application Ser. No. 11/624,542, entitled "Virtualized Access to I/O Subsystems", and U.S. patent application Ser. No. 11/624,573, entitled "Virtual Input/Output Server", both filed on Jan. 18, 2007, which are incorporated herein by reference for all purposes. As explained below, the connection/communication protocol uses an identifier called a logical node identifier (LNID) to identify source and destination nodes for packets that travel over the switched fabric.

Figure 1:
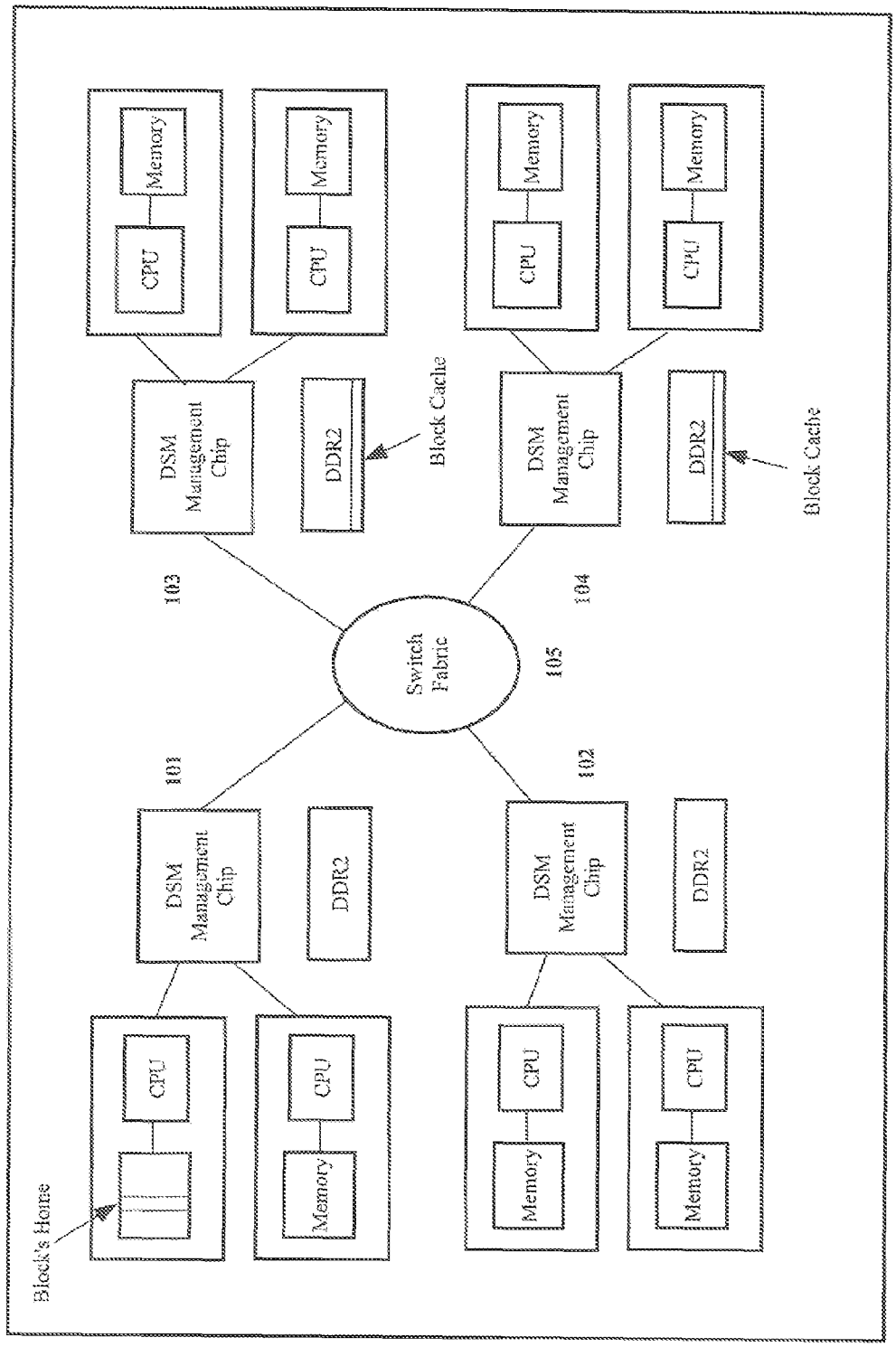
FIG. 1 is a block diagram showing a DSM system, which system might be used with some embodiments of the present invention.

FIG. 1 is a diagram showing a ccNUMA DSM system, which system might be used with a particular embodiment of the invention. In this DSM system, four nodes (labeled 101, 102, 103, and 104) are connected to each other over a switched fabric (labeled 105) such as Ethernet or InfiniBand. In turn, each of the four nodes includes two Opteron CPUs, a DSM-management chip, and memory in the form of DDR2 S DRAM (double-data-rate two synchronous dynamic random access memory). In this embodiment, each Opteron CPU includes a local main memory connected to the CPU. This DSM system provides NUMA (non-uniform memory access) since each CPU can access its own local main memory faster than it can access the other memories shown in FIG. 1.

Also as shown in FIG. 1, a block of memory has its "home" in the local main memory of one of the Opteron CPUs in node 101. That is to say, this local main memory is where the system's version of the memory block is stored, regardless of whether there are any cached copies of the block. Such cached copies are shown in the DDR2s for nodes 103 and 104. The DSM-management chip includes hardware logic (e.g., the CMM) to enforce a coherence protocol and make the DSM system cache-coherent (e.g., ccNUMA) when multiple nodes are caching copies of the same block of memory.

B. Example System Architecture of a DSM-Management Chip

Figure 2:
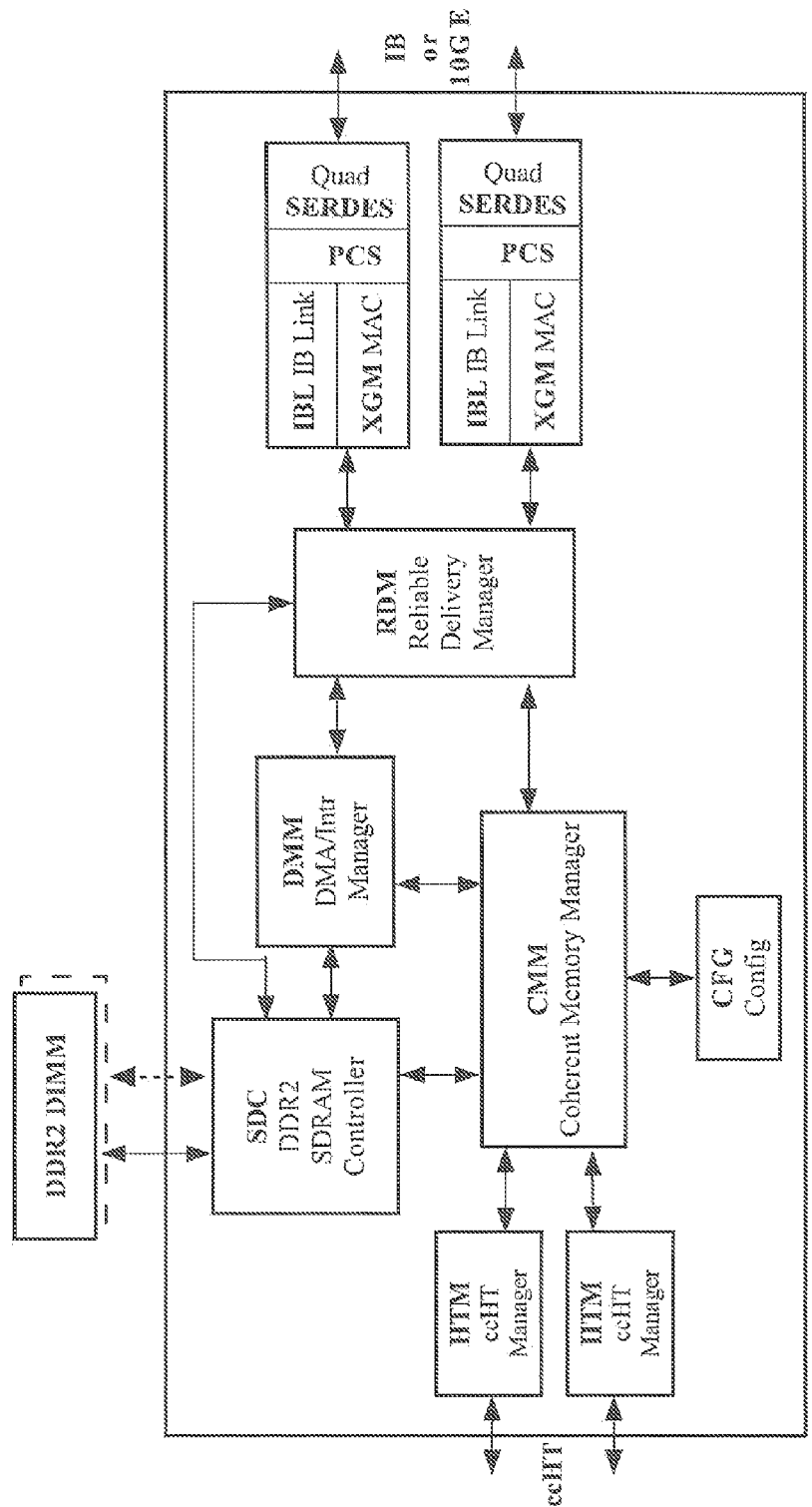
FIG. 2 is a block diagram showing some of the physical and functional components of an example DSM-management chip or logic circuit, which chip might be used as part of a node with some embodiments of the present invention.

FIG. 2 is diagram showing the physical and functional components of a DSM-management chip, which chip might be used as part of a node with particular embodiments of the invention. The DSM-management chip includes interconnect functionality facilitating communications with one or more processors, which might be Opteron processors offered by Advanced Micro Devices (AMD), Inc., of Sunnyvale, Calif., in some embodiments. As FIG. 2 illustrates, the DSM-management chip includes two HyperTransport Managers (HTM), each of which manages communications to and from a processor over a HT (HyperTransport) bus. More specifically, an HTM provides the PHY and link layer functionality for a cache coherent HT interface such as Opteron's ccHT. The HTM captures all received HT packets in a set of receive queues per interface (e.g., posted/non-posted command, request command, probe command and data) which are consumed by the Coherent Memory Manager (CMM). The HTM also captures packets from the CMM in a similar set of transmit queues per interface and transmits those packets on the HT interface. As a result of the two HTMs, the DSM-management chip becomes a coherent agent with respect to any bus snoops broadcast over the cache-coherent HT bus by a processor's memory controller. Of course, other inter-chip or bus communications protocols might be used in other embodiments of the present invention.

Also as shown in FIG. 2, the two HTMs are connected to a Coherent Memory Manager (CMM), which enforces a coherence protocol and thereby provides cache-coherent access to memory shared by the nodes that are part of the DSM fabric. In addition to interfacing with the Opteron processors through the HTM, the CMM interfaces with the fabric via the RDM (Reliable Delivery Manager). Additionally, the CMM provides interfaces to the HTM for DMA (Direct Memory Access) and configuration.

In some embodiments, the CMM behaves like both a processor cache on a cache-coherent (e.g., ccHT) bus and a memory controller on a cache-coherent (e.g., ccHT) bus, depending on the scenario. In particular, when a processor on a node performs an access to a home (or local) memory address, the home (or local) memory will generate a probe request that is used to snoop the caches of all the processors on the node. The CMM will use this probe to determine if it has exported the block of memory containing that address to another node and may generate DSM probes (over the fabric) to respond appropriately to the initial probe. In this scenario, the CMM behaves like a processor cache on the cache-coherent bus.

When a processor on a node performs an access to a remote memory, the processor will direct this access to the CMM. The CMM will examine the request and satisfy it from the local cache, if possible, and, in the process, generate any appropriate probes. If the request cannot be satisfied from the local cache, the CMM will send a DSM request to the remote memory's home node to (a) fetch the block of memory that contains the requested data or (b) request a state upgrade. In this case, the CMM will wait for the DSM response before it responds back to the processor. In this scenario, the CMM behaves like a memory controller on the ccHT bus.

The RDM manages the flow of packets across the DSM-management chip's two fabric interface ports. The RDM has two major clients, the CMM and the DMA Manager (DMM), which initiate packets to be transmitted and consume received packets. The RDM ensures reliable end-to-end delivery of packets using a connection/communication protocol called Reliable Delivery Protocol (RDP). On the fabric side, the RDM interfaces to the selected link/MAC (XGM for Ethernet, IBL for InfiniBand) for each of the two fabric ports. In particular embodiments, the fabric might connect nodes to other nodes. In other embodiments, the fabric might also connect nodes to virtual IO servers. In particular embodiments, the processes using LNIDs described below might be executed by the RDM.

The XGM provides a 10G Ethernet MAC function, which includes framing, inter-frame gap handling, padding for minimum frame size, Ethernet FCS (CRC) generation and checking, and flow control using PAUSE frames. The XGM supports two link speeds: single data rate XAUI (10 Gbps) and double data rate XAUI (20 Gbps). In particular embodiments, the DSM-management chip has two instances of the XGM, one for each fabric port. Each XGM instance interfaces to the RDM, on one side, and to the associated PCS, on the other side.

The IBL provides a standard 4-lane IB link layer function, which includes link initialization, link state machine, CRC generation and checking, and flow control. The IBL block supports two link speeds, data rate (8 Gbps) and double data rate (16 Gbps), with automatic speed negotiation. In particular embodiments, the DSM-management chip has two instances of the IBL, one for each fabric port. Each IBL instance interfaces to the RDM, on one side, and to the associated Physical Coding Sub-layer (PCS), on the other side.

The PCS, along with an associated quad-serdes, provides physical layer functionality for a 4-lane InfiniBand SDR/DDR interface, or a 10G/20G Ethernet XAUI/10GBase-CX4 interface. In particular embodiments, the DSM-management chip has two instances of the PCS, one for each fabric port. Each PCS instance interfaces to the associated IBL and XGM.

The DMM shown in FIG. 2 manages and executes direct memory access (DMA) operations over RDP, interfacing to the CMM block on the host side and the RDM block on the fabric side. For DMA, the DMM interfaces to software through the DmaCB table in memory and the on-chip DMA execution and completion queues. The DMM also handles the sending and receiving of RDP interrupt messages and non-RDP packets, and manages the associated inbound and outbound queues.

The DDR2 SDRAM Controller (SDC) attaches to a one or two external 240-pin DDR2 SDRAM DIMM, which is actually external to the DMS-management chip, as shown in both FIG. 1 and FIG. 2. In particular embodiments, the SDC provides SDRAM access for the CMM and the DMM.

In some embodiments, the DSM-management chip might comprise an application specific integrated circuit (ASIC), whereas in other embodiments the chip might comprise a field-programmable gate array (FPGA). Indeed, the logic encoded in the chip could be implemented in software for DSM systems whose requirements might allow for longer latencies with respect to cache coherence, DMA, interrupts, etc.

C. RDP Packets and Their Headers

Figure 3:
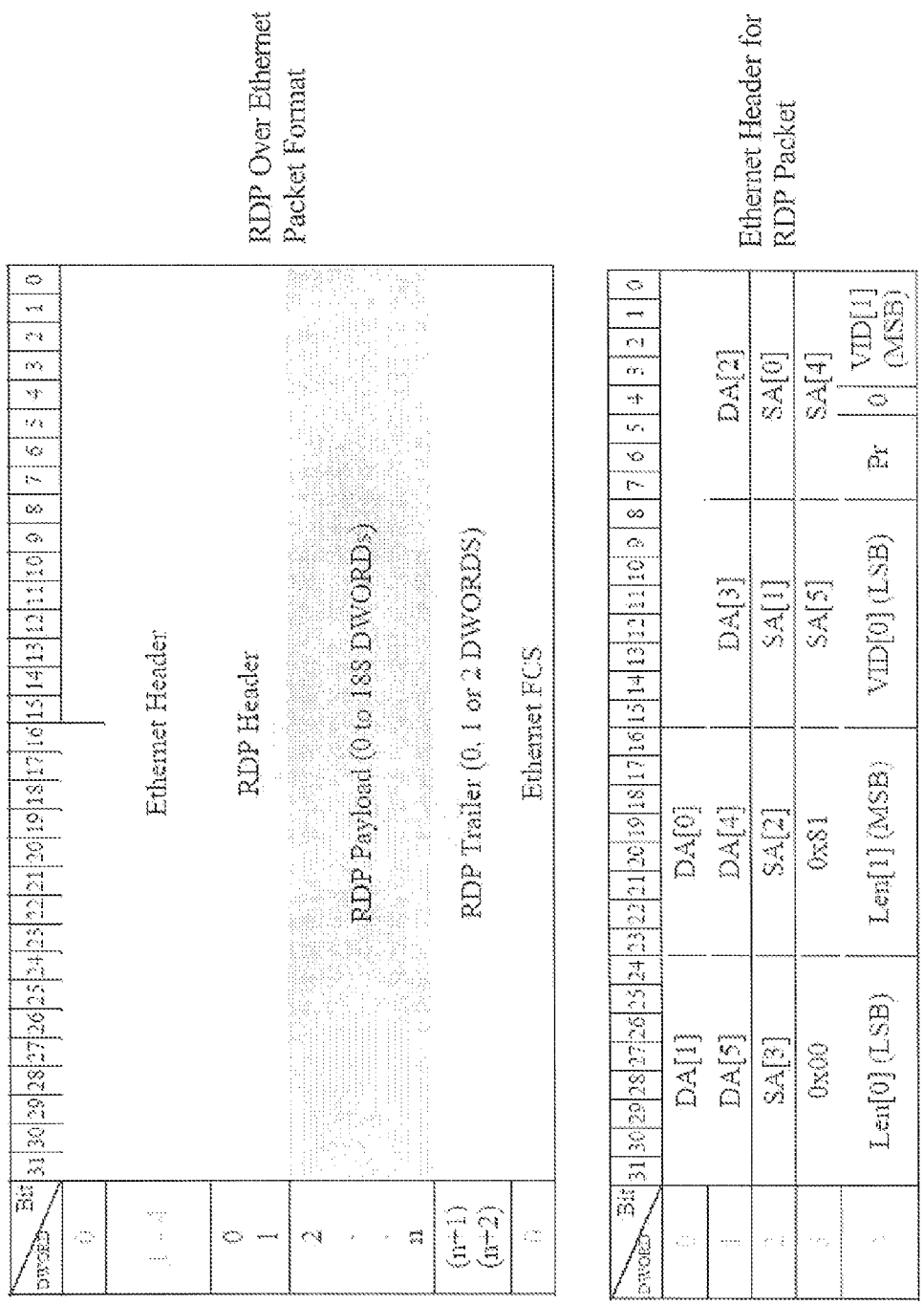
FIG. 3 is a diagram showing the format of an RDP over Ethernet packet and its header, which formats might be used in some embodiments of the present invention.

FIG. 3 is a diagram showing the format of a packet for RDP over Ethernet and the packet's header, which formats might be used in some embodiments of the present invention. When RDP runs over the Ethernet MAC layer, an RDP packet is encapsulated in an Ethernet MAC frame. The Ethernet header of an encapsulated RDP packet is a VLAN-tagged header (where VLAN stands for virtual local area network). In FIG. 3, SA identifies the 6-byte source MAC address and DA identifies the 6-byte destination MAC address.

The Reliable Delivery Protocol allows RDP and non-RDP packets to co-exist on the same fabric. When RDP runs over the Ethernet MAC layer, RDP and non-RDP packets are distinguished from each other by the presence of the VLAN header and the value of the Length/Type field following it. For an RDP packet: (a) the VLAN header is present, i.e., the first Length/Type field (following the last SA byte) has a value of 0x0081; and (h) the second Length/Type field (following the VLAN header) has a value less than 1536 (frame length). An Ethernet frame that does not satisfy both of the above conditions is a non-RDP packet.

Figure 4:
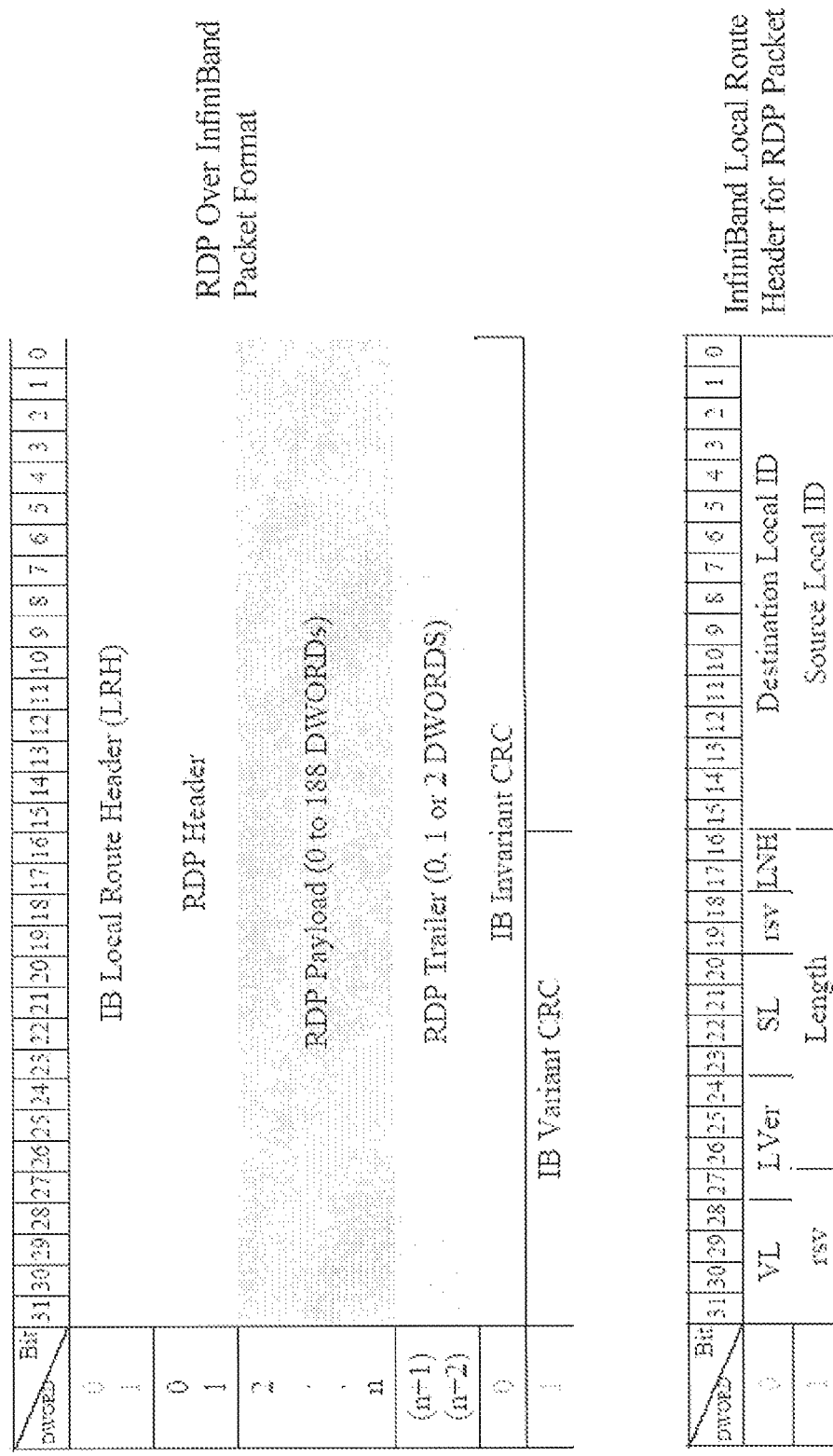
FIG. 4 is a diagram showing the format of an RDP over InfiniBand packet and its header, which formats might be used in some embodiments of the present invention.

FIG. 4 is a diagram showing the format of a packet for RDP over InfiniBand and the packet's header, which formats might be used in some embodiments of the present invention. It will be appreciated that the header includes fields for Source Local ID and Destination Local ID. When RDP runs over the IB link layer, an RDP packet is encapsulated into an IB packet. The format of an IB Local Transport Packet is used, although the 12-byte Base Transport Header (BTH) which is normally present after the Local Route Header (LRH) is replaced by the RDP header (8 bytes) and the first 4 bytes of the RDP payload. From the standpoint of the IB standard, bits 31:24 of the first DWORD of the RDP Header is the OpCode field of Base Transport Header (BTH). The most significant two bits (31:30) of that field have a fixed value of 0x3 (binary 11) for RDP packets, which specifies a 'Manufacturer Specific OpCode'. The Rsv8 field of the BTH (bits 31:24 of the second DWORD) is not protected by the 32-bit IB Invariant CRC (ICRC). This corresponds to the most significant 8 bits of the DstLNID. Thus, these bits do not have end-to-end protection but do have point-to-point protection by the 16-bit Variant CRC (VCRC), which presents an insignificant risk of failure since the DstLNID is only used as a packet validation field at the destination node in conjunction with many other validation fields. A false match of a corrupted LNID MSB (most significant bit) with good VCRC has very low probability and would only occur if the connection parameters were set up inconsistently at the source and destination nodes.

When RDP runs over the InfiniBand link layer, RDP and non-RDP packets are distinguished by the values of the LNH field in the IB Local Route Header and the OpCode field in the IB Base Transport Header. For an RDP packet: (a) LNH=0x2 (IBA Local); and (b) OpCode bits [7:6]=0x3 (Manufacturer Specific OpCode). An InfiniBand packet that does not satisfy both of the above conditions is a non-RDP packet.

Figure 5:
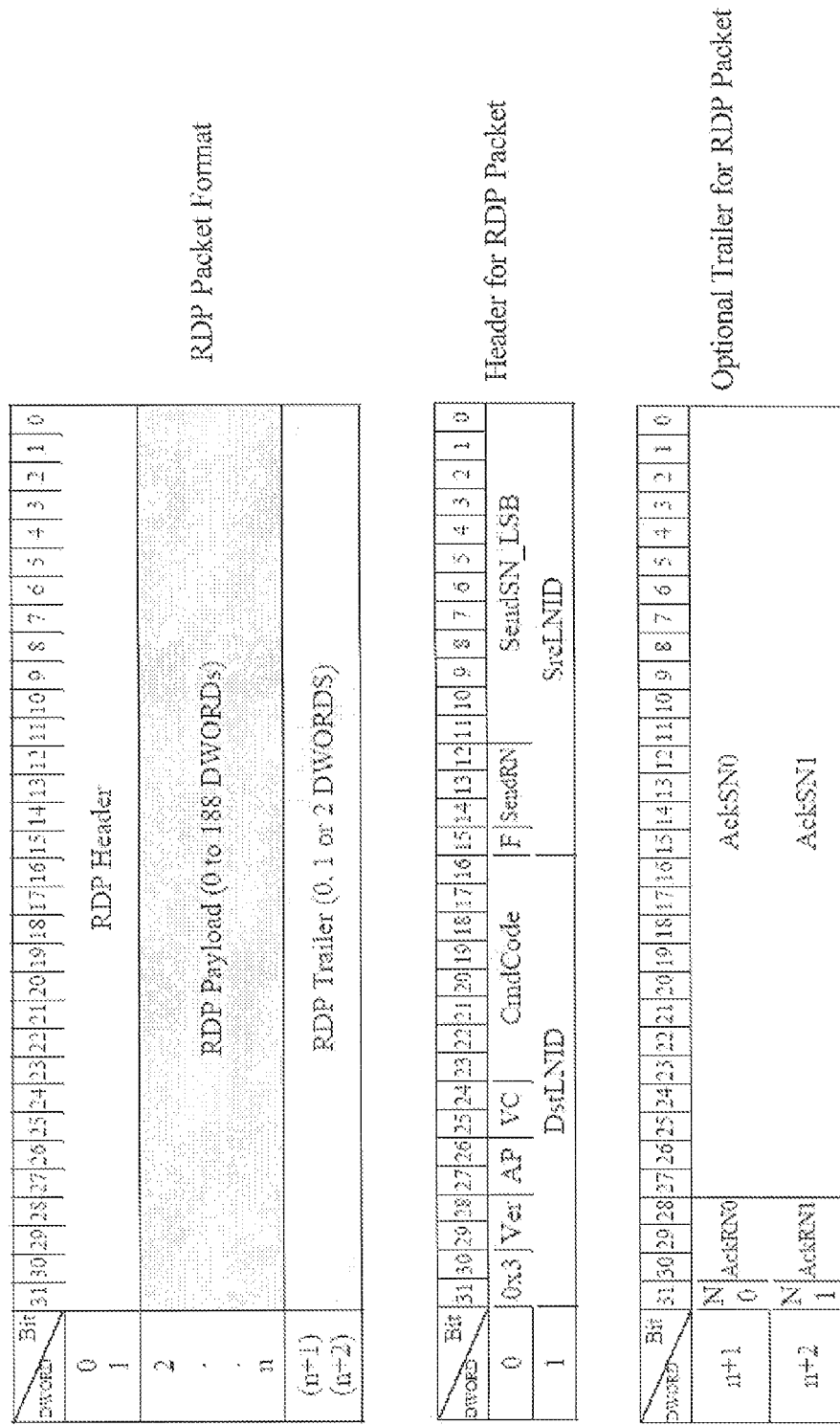
FIG. 5 is a diagram showing the format of an RDP packet, its header, and its optional trailer, which formats might be used in some embodiments of the present invention.

FIG. 5 is a diagram showing the format of an RDP packet and its header, which formats might be used in some embodiments of the present invention. An RDP packet consists of a header, payload, and optional trailer. As shown in FIG. 5, another field in the RDP packet is the SrcLNID (Source Logical Node ID)) which identifies the packet's source node. This is the connection identifier (i.e., remote LNID) at the destination node. This field is also 16 bits wide. Also as shown in FIG. 5, one of the fields in an RDP packet is the DestLNID (Destination Logical Node ID) which identities the packet's destination node. This is the connection identifier (i.e., remote LNID) at the source node. This field is 16 bits wide.

D. Using LNIDs with RDP

In particular embodiments, the DSM system uses a software data structure called the connection control block (CCB), stored in local memory such as the local main memory shown in FIG. 1, to facilitate implementation of the RDP protocol. The RDM uses a received packet's source LNID as an index into the CCB to find an entry for the connection corresponding to the packet. FIG. 6 is a diagram showing the format of a CCB entry for a single connection, which format might be used in sonic embodiments of the present invention. As shown in FIG. 6, each entry records the fabric address for two paths, Path 0 and Path 1, which may correspond to the two fabric interface ports shown connected to the RDM in FIG. 2. In other embodiments, there might be more than two paths, corresponding to more than two fabric interface ports. It will be appreciated that the CCB entry has a field called MY_LNID, which identifies the LNID for the RDM's node.

For an RDP connection between a pair of nodes, the node at each end uses an LNID to refer to the node at the other end. Within a multi-node virtual server (VS), every node is assigned a unique LNID, possibly by some management entity for the DSM system. For example, within a three-node VS, the LNID values might be 0, 1, and 2, or 1, 3, and 4, i.e., they not need to be sequentially incrementing from 0. In addition, every server (multi-node virtual server or standalone server) assigns a unique LNID to each node that communicates with it. For example, a standalone server node that communicates with the virtual server described above might be assigned an LNID value of 16 by the VS. If that same node communicates with another server, it may be assigned the same LNID or a different LNID by that server. Therefore, LNID assignments are unique from the standpoint of a given server, but they are not unique across servers.

Figure 7:
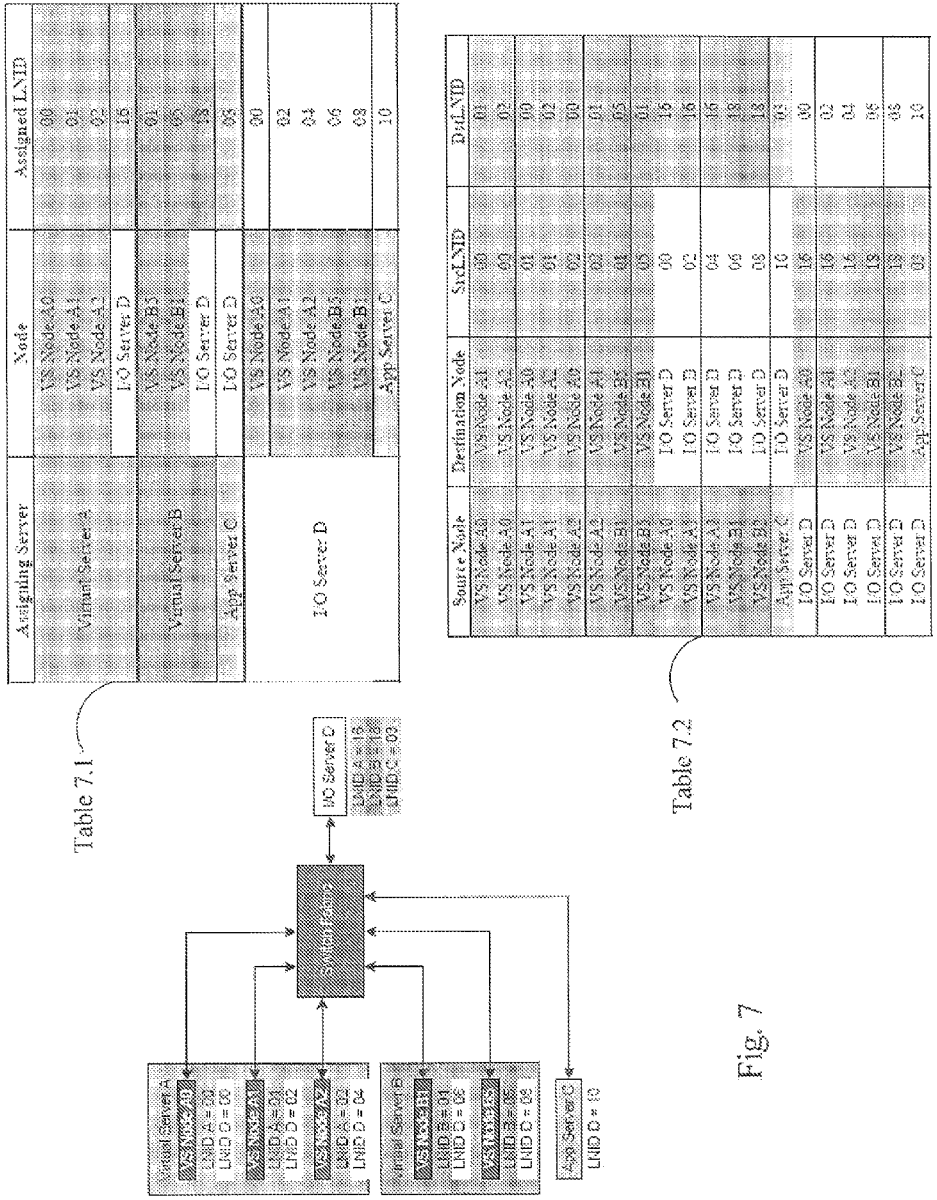
FIG. 7 is a diagram showing an example illustrating the use of LNIDs with respect to the RDP protocol, which protocol might be used with an embodiment of the present invention.

An example of LNID assignments is shown in FIG. 7. In the example, a virtual computing environment (VCE) consists of two virtual servers (A and B), an application server (C), and a virtual I/O server (D). In this example, virtual server A assigns LNID values 0, 1, and 2 to each of its own nodes (VS nodes A0, A1, and A2, respectively) and an LNID value of 16 to virtual I/O server D. Virtual server B assigns values of 1 and 5 to each of its own nodes (VS nodes B1 and B5, respectively) and an LNID value of 18 to virtual I/O server D. Application server C assigns an LNID value of 3 to virtual I/O server D. Virtual I/O server D assigns LNID values 0, 2, and 4, to VS nodes A0, A1 and A2, respectively, and LNID values of 6 and 8 to VS nodes B1 and B5. Finally, virtual I/O server D assigns a value of 10 to application server C. These various assignments are collected and summarized in Table 7.1 in FIG. 7.

Table 7.2 shows the SrcLNID and DstLNID values used in the headers of RDP packets exchanged between different node pairs. For example, VS nodes A0 and A1 both belong to virtual server A, so a packet from A0 to A1 will have a SrcLNID value of 0 (LNID assigned to A0 by VS A), and a DstLNID value of 1 (LNID assigned to A1 by VS A). As another example, a packet from A1 to I/O server D will have a SrcLNID value of 2 (LNID assigned to A1 by I/O server D) and a DstLNID value of 16 (LNID assigned by VS A to I/O server D).

Figure 8:
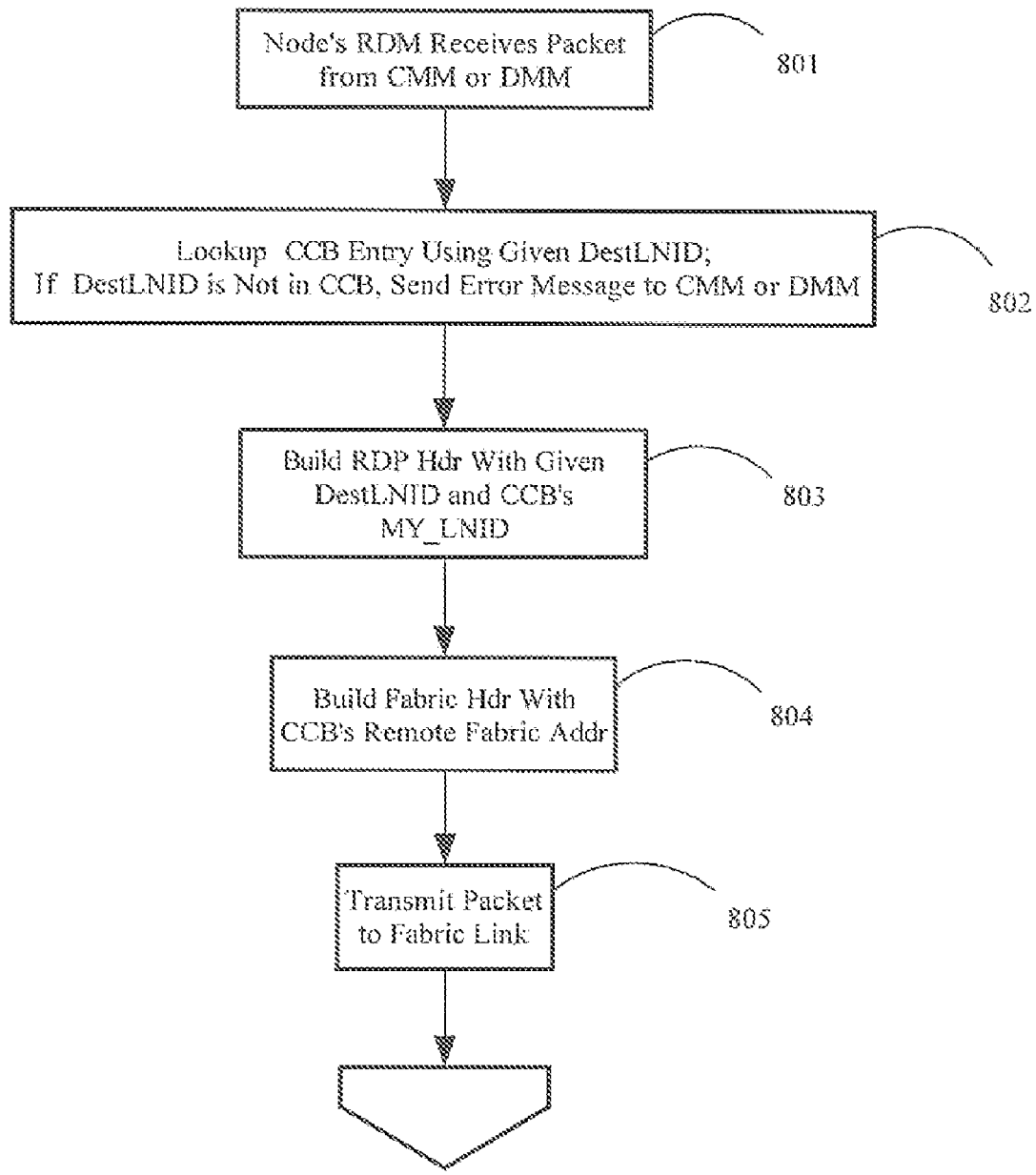
FIG. 8 is a diagram showing a flowchart of an example process for building an RDP packet for transmission over the switched fabric network, which process might be used with an embodiment of the present invention.

FIG. 8 is a diagram showing a flowchart of an example process for building an RDP packet for transmission over the switched fabric network, which process might be used with an embodiment of the present invention. In the process's first step 801, the node's Reliable Delivery Manager (RDM) receives a DestLNID and data for an RDP packet from the node's CMM or DMM. The RDM uses the packet's DestLNID to look up the entry corresponding to the DestLNID in the Connection Control Block (CCB), in step 802. If there is no corresponding entry, the RDM sends an error message to the CMM or DMM, as the case may be. Then in step 803, the RDM builds an RDP header for an RDP packet for the data, using the DestLNID and the CCB entry's MY_LNID value. In step 804, the RDM builds a fabric header for the RDP packet, using information in the CCB entry's remote fabric address. Once the RDP packet is complete, the RDM sends the packet to the fabric link for transmission to the remote node, in step 805.

Figure 9:
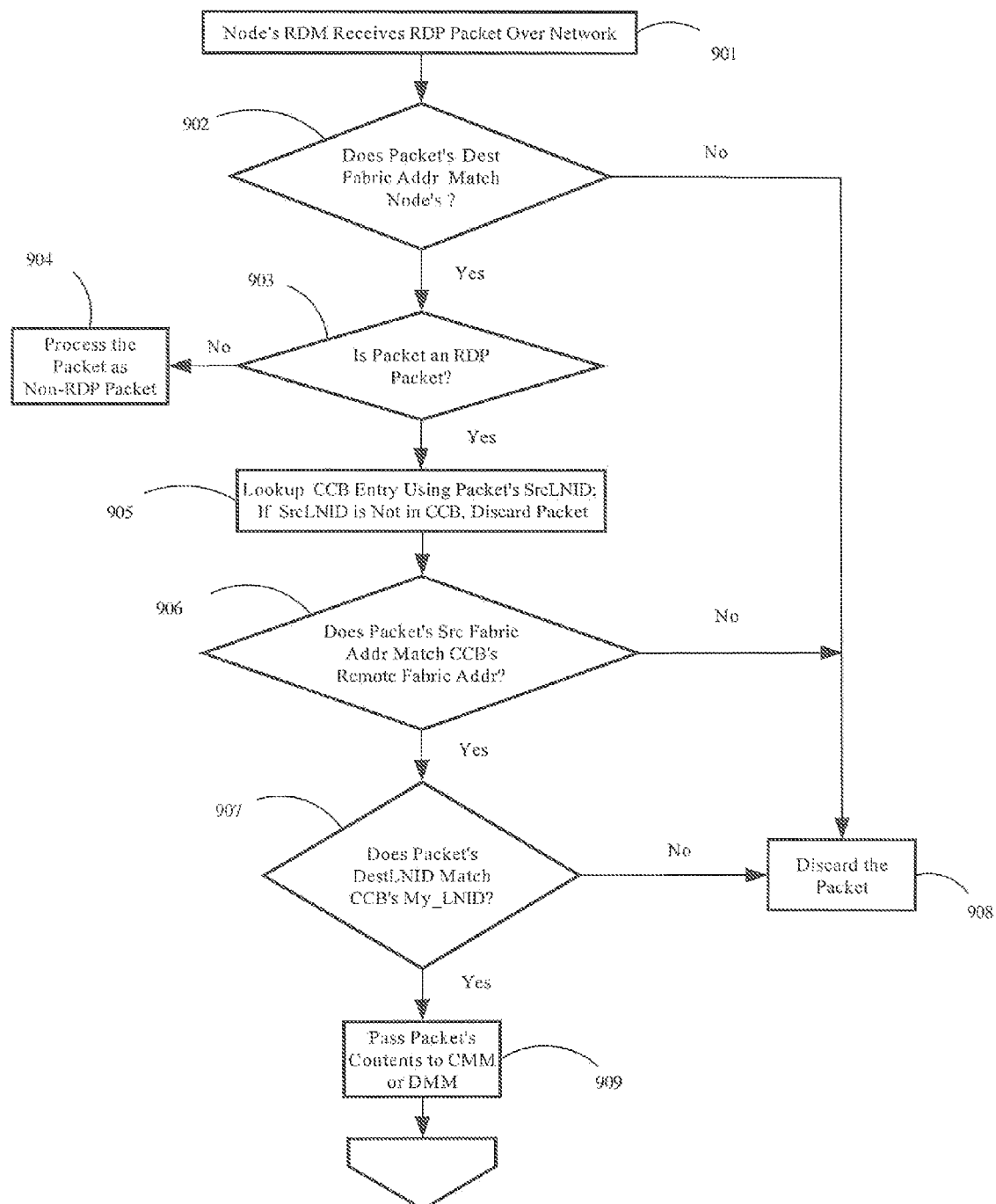
FIG. 9 is a diagram showing a flowchart of an example process for validating an RDP packet received over the switched fabric network, which process might be used with an embodiment of the present invention.

FIG. 9 is a diagram showing a flowchart of an example process for validating an RDP packet received over the switched fabric network, which process might be used with an embodiment of the present invention. In the process's first step 901, a node's RDM receives an RDP packet over the switched fabric network. The RDM then checks to see whether the packet's destination fabric address (e.g., the 6-byte MAC DA in an Ethernet header or the Destination Local ID in an Infiniband LRH) matches the node's fabric address, in step 902. If not, the RDM discards the packet. Otherwise, the RDM goes to step 903 and determines whether the packet is an RDP packet. If not, the RDM will process the packet as a non-RDP packet, in step 904. Otherwise, if the packet is an RDP packet, the RDM uses the packet's SrcLNID to look up the entry corresponding to the SrcLNID in the Connection Control Block (CCB), in step 905. If there is no corresponding entry, the RDM discards the packet. Then the RDM goes to step 906 and checks to make sure that the packet's source fabric address (e.g., the 6-byte MAC SA in an Ethernet header or the Source Local ID in an Infiniband LRH) matches the CCB entry's remote fabric address (e.g., for Path 0 or Path 1). If not, the RDM discards the packet. Otherwise, the RDM checks to determine whether the packet's DestLNID matches the CCB entry's MY_LNID, in step 907. If not, the RDM discards the packet. But if there is a match, the RDM forwards the packet to the CMM or DMM for further processing.

E. Using LNIDs With Memory-Addressing Scheme

Figure 10:
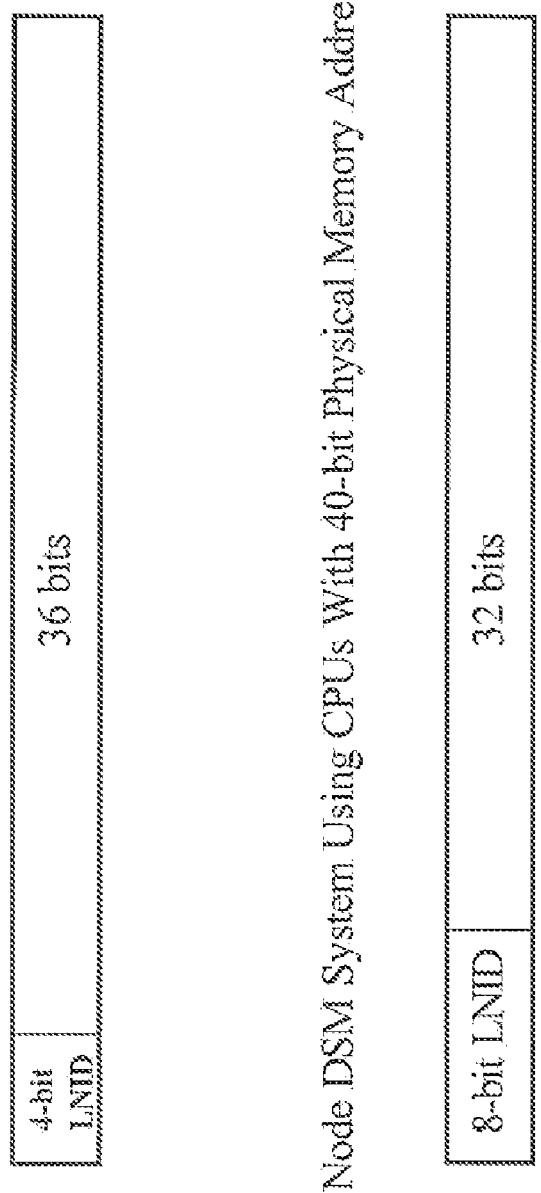
FIG. 10 is a diagram showing the format of a 40-bit physical memory address in a 16-node DSM system and the format of a 40-bit physical memory address in a 256-node DSM system, which formats might be used with embodiments of the present invention.

As indicated earlier, the DSM system also uses LNIDs in its memory-addressing scheme. In particular embodiments, the physical memory address width is 40-bits (e.g., in DSM systems that use the present generation of Opteron CPUs), though it will be appreciated that there are numerous other suitable widths. FIG. 10 is a diagram showing the format of a 40-bit physical memory address in a 16-node DSM system and the format of a 40-bit physical memory address in a 256-node DSM system. As shown in FIG. 10, the four most significant bits comprise an LNID in the 16-node DSM system and the eight most significant bits comprise an LNID in the 256-node DSM system.

In particular embodiments of the DSM system, the physical address space for a virtual server is arranged so that the local node's memory always starts at address 0 (zero). One reason for using this arrangement is compatibility with legacy system software, in particular embodiments. Specifically, with local memory starting at address 0, system software (e.g., boot code) accesses local memory the same way that it does on a standard server. Another reason for using this arrangement is that it simplifies the address lookup in the CMM. For a memory read/write request from a local processor, an address in the lower $\frac{1}{16}$th or $\frac{1}{256}$th segment of the 40-bit address space is always local and all other addresses map to memory in other nodes.

To see how the arrangement works, consider the example of a virtual server consisting of three nodes: 0, 1, and 2. In a 16-node DSM system, the total addressable memory space for this virtual server would be 1 terabyte ($2^{40}$) and each node would be allocated a segment which is $\frac{1}{16}$ of that space (64GB or $2^{36}$). From a global view, the first 64GB segment of the physical address space starting at address 0 would be allocated to node 0 (i.e., the node whose LNID equals 0), the next 64GB segment to node 1, and the following segment to node 2. The remaining 13 segments would be unused since LNIDs 4-15 are not used.

Figure 11:
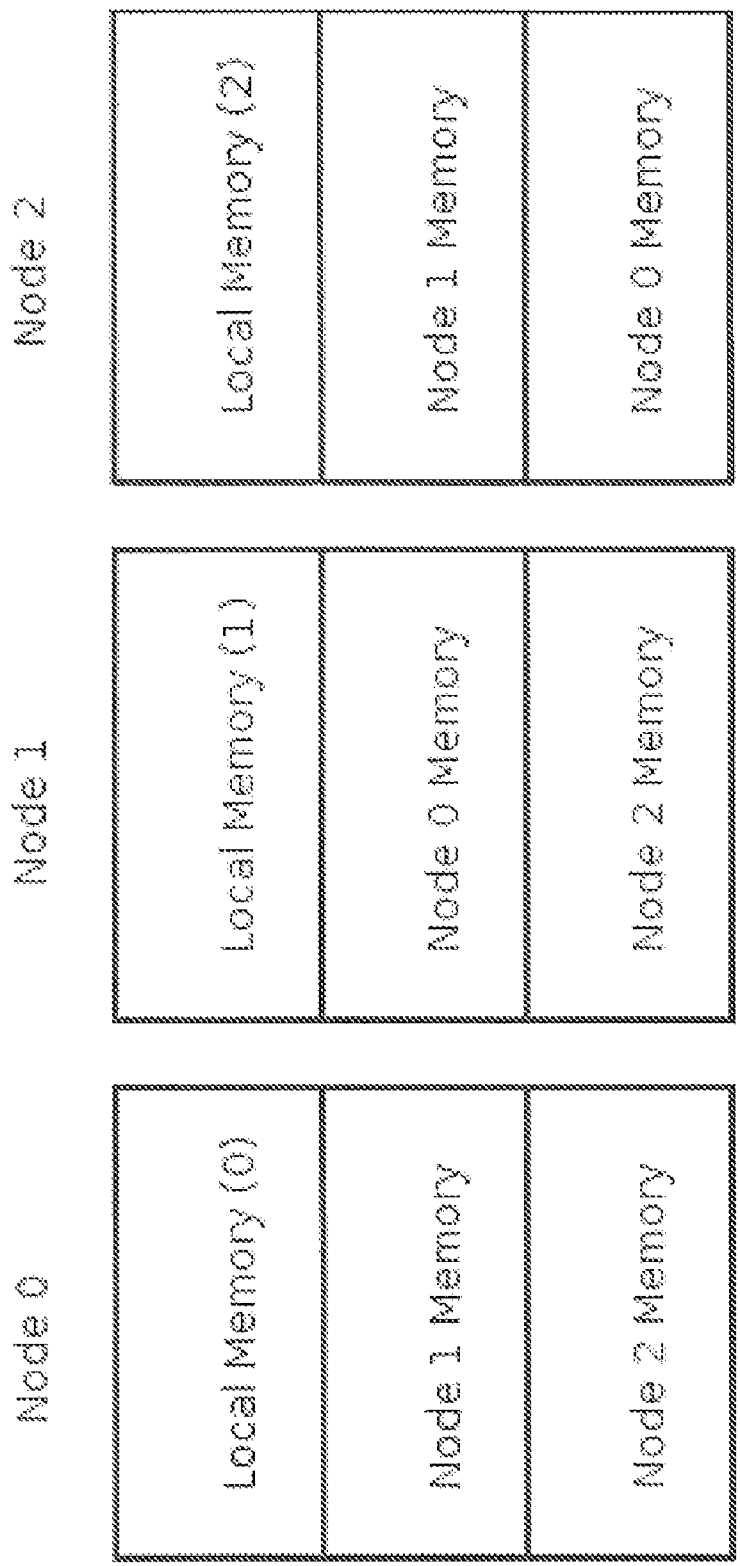
FIG. 11 is a diagram showing, for didactic purposes, the local views of a physical address space for a virtual server comprised of three nodes.

FIG. 11 shows this physical address space from the local view of each of the three nodes in the virtual server. The local view of node 0 would be the same as the global view and is shown in FIG. 11 under the label "Node 0", with Local Memory (0) first, Node 1 Memory second, and Node 2 Memory third. The local view of node 1 would be as shown under the label "Node 1", with Local Memory (1) first, Node 0 Memory second, and Node 2 Memory third. And the local view of node 2 would be as shown under the label "Node 2", with Local Memory (2) first, Node 1 Memory second, and Node 0 Memory third.

It will be appreciated that in order to accomplish this arrangement, the locations of the local segment and the node 0 segment are swapped in the address map. And since MY_LNID, as defined above, is the LNID assigned to the local node, this is equivalent to swapping MY_LNID with LNID 0 in the address map. However, such a swapping would create confusion in the DSM system if it were applied to memory traffic leaving the node over the switched fabric. Therefore, the node's CMM reverses the swapping for traffic leaving the node.

Figure 12:
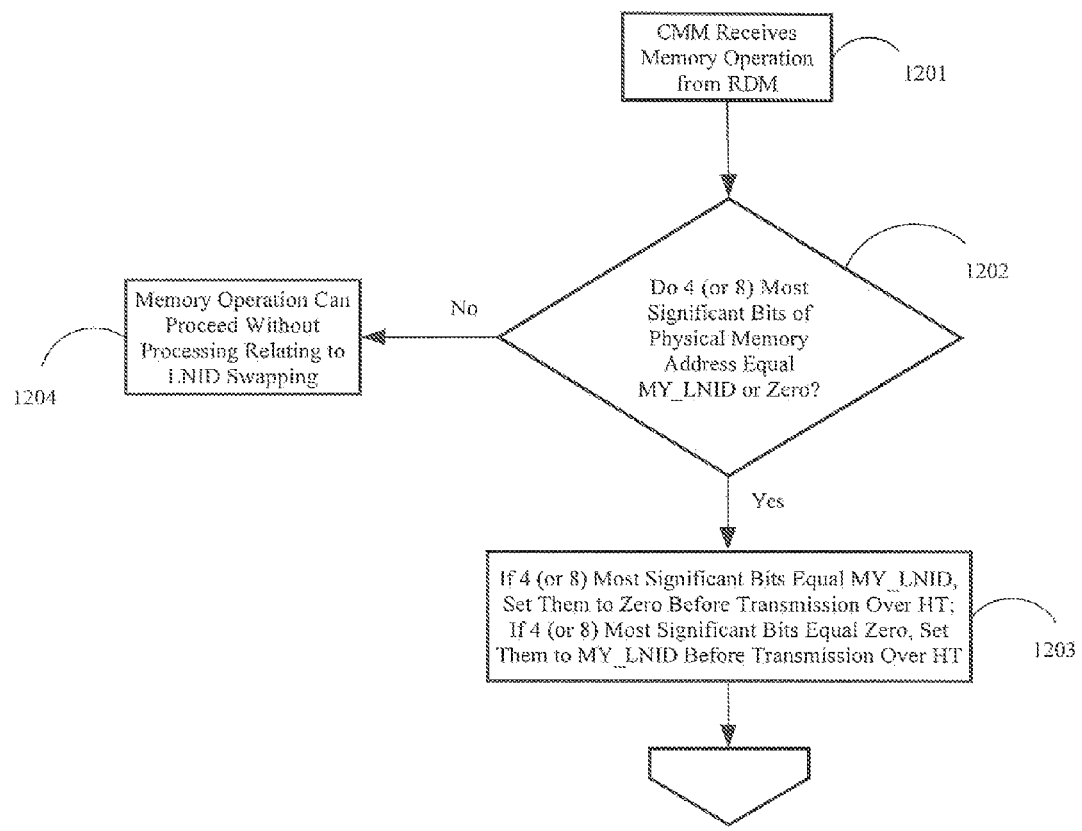
FIG. 12 is a diagram showing a flowchart of an example process for altering a physical memory address prior to transmission over a HyperTransport bus, which process might be used with an embodiment of the present invention.

FIG. 12 is a diagram showing a flowchart of an example process for altering a physical memory address, by the swapping a described above, prior to transmission over a HyperTransport bus. In the process's first step 1201, a node's CMM receives a memory operation (e.g., a read, write, or probe) pertaining to a physical memory address from the RDM on the DSM-management chip. In step 1202, the CMM determines whether the four (or eight) most significant bits in the physical address are equal to: (1) the MY_LNID value for the node; or (2) zero. If so, the CMM goes to step 1203, where: (1) if those bits are equal to the MY_LNID value, the CMM sets the bits to zero (e g., by changing to zero the four (or eight) most significant bits in the physical memory address) before transmission of the operation over the HyperTransport bus; and (2) if those bits are equal to zero, the CMM sets those bits to MY_LNID (e.g., by changing to MY_LNID the four (or eight) most significant bits in the physical memory address) before transmission of the operation over the HyperTransport bus. Otherwise, if those bits are not equal to MY_LNID or zero, the CMM goes to step 1204 and allows the memory operation to proceed without processing relating to LNID swapping.

Figure 13:
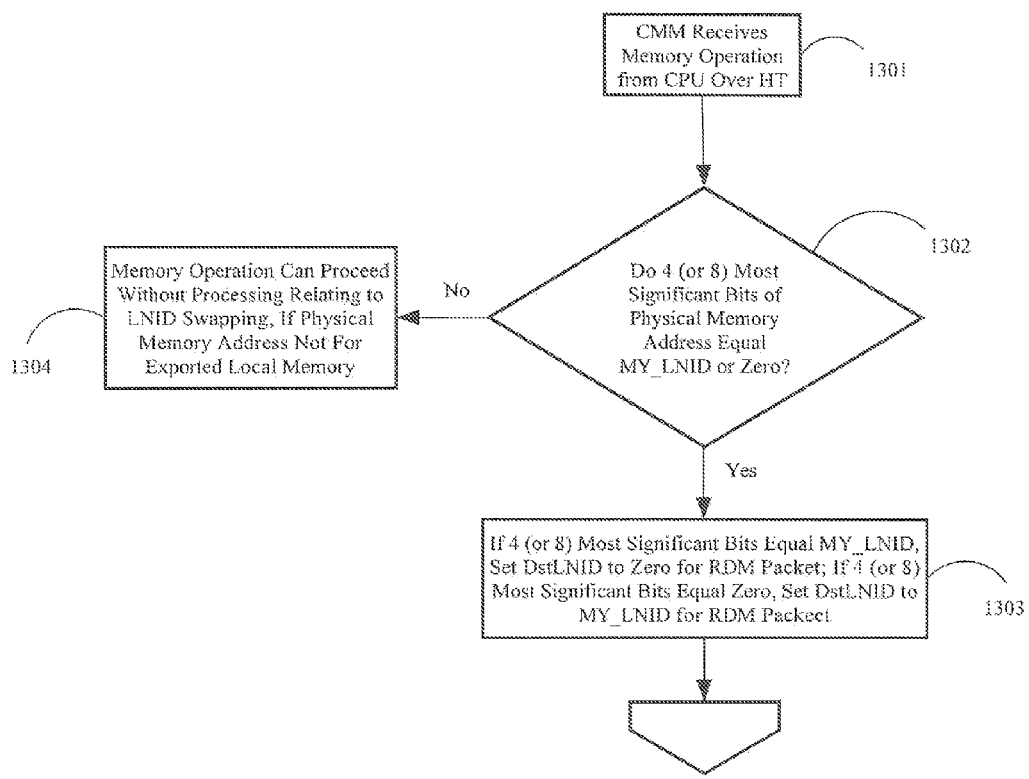
FIG. 13 is a diagram showing a flowchart of an example process for altering a physical memory address prior to transmission over a switched fabric, which process might be used with an embodiment of the present invention.

FIG. 13 is a diagram showing a flowchart of an example process for altering a physical memory address, by reversing the swapping as described above, prior to transmission over a switched fabric. In the process's first step 1301, a node's CMM receives a memory operation (e.g., a read, write, or probe) pertaining to a physical memory address from one of the node's CPUs over the HyperTransport (e.g., ccHT) bus that connects the node's CPUs to the node's DSM-management chip. In step 1302, the CMM determines whether the four (or eight) most significant bits in the physical address are equal to (1) the MY_LNID value for the node; or (2) zero. If so, the CMM goes to step 1303, where: (1) if those bits are equal to the MY_LNID value, the CMM sets the DstLNID value to zero (e g., by changing to zero the four (or eight) most significant bits in the physical memory address) before transmission of the operation to the RDM; and (2) if those bits are equal to zero, the CMM sets the DstLNID value to MY_LNID (e.g. by changing to MY_LNID the four (or eight) most significant bits in the physical memory address) before transmission of the operation to the RDM. Otherwise, if those bits are not equal to MY_LNID or zero, the CMM goes to step 1304 and allows the memory operation to proceed without processing relating to LNID swapping, if the physical memory address is not for exported local memory. (If the physical memory address is for exported local memory, a probe operation to another physical memory address might result, feeding back into the process at step 1301.)

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many other possible orderings of the steps in the processes described above and many other possible modularizations of those orderings. Also, it will be appreciated that the above processes relating to memory-addressing will work with physical memory addresses that exceed 40-bits in width and DSM systems that have more than 256 nodes. Further, it will be appreciated that the DSM system will work with nodes whose CPUs are not Opterons having a ccHT bus. As a result, the invention is not limited to the specific examples and illustrations discussed above, but only by the following claims and their equivalents.

What is claimed is;

1. A method, comprising:
receiving, at a distributed memory logic circuit of a first node, data for a packet destined to a distributed memory logic circuit of a second node, wherein the first and second nodes are connected by a network switch fabric and are parts of a distributed shared memory system, and wherein the data for the packet includes a physical memory address in which one or more bits in the address comprise a destination logical node identifier for the second node;
using the destination logical node identifier as an index into a connection control block to locate an entry for a connection between the first and second nodes, wherein the connection control block is stored in a local memory on the first node;
building a packet in a format of a connection and communication protocol using the data, the destination logical node identifier, and a logical node identifier for the first node, wherein the logical node identifier for the first node is included in the connection control block entry;
adding, to the packet, a header that includes a switch fabric address for the second node, wherein the switch fabric address is identified in the located entry of the connection control block; and
transmitting the packet on a link to the switch fabric.

2. A method as in claim 1, wherein the distributed shared memory system is a cache coherent non-uniform memory access system.

3. A method as in claim 1, wherein the distributed memory logic circuit in the first node sets the destination logical node identifier to zero if the destination logical node identifier in the physical memory address equals the logical node identifier for the first node.

4. A method, comprising:
receiving, at a distributed memory logic circuit of a first node, a packet from a distributed memory logic circuit of a second node, wherein the packet includes a source logical node identifier and wherein the first and second nodes are connected by a network switch fabric and are parts of a distributed shared memory system;
determining whether a destination switch fabric address included in the packet matches a switch fabric address for the first node;
using the source logical node identifier as an index into a connection control block to locate an entry for the a connection between the first and second nodes, wherein the connection control block is stored in a local memory on the first node;
determining whether a destination logical node identifier included in the packet matches a logical node identifier for the first node, wherein the logical node identifier for the first node is identified in the located entry of the connection control block; and
accepting data in the packet for further processing by the first node.

5. The method of claim 4, wherein the packet is discarded if the destination switch fabric address included in the packet does not match the switch fabric address for the first node.

6. The method of claim 4, wherein the packet is discarded if the destination logical node identifier does not match the logical node identifier for the first node identified in the located entry of the connection control block.

7. The method of claim 4, wherein the distributed shared memory system is a cache coherent non-uniform memory access system.

8. A distributed memory logic circuit encoded with executable logic, the logic when executed operable to:
    receive, at the distributed memory logic circuit of a first node, data for a packet destined to a distributed memory logic circuit of a second node, wherein the first and second nodes are connected by a network switch fabric and are parts of a distributed shared memory system, and wherein the data for the packet includes a physical memory address in which one or more bits in the address comprise a destination logical node identifier for the second node;
    use the destination logical node identifier as an index into a connection control block to locate an entry for a connection between the first and second nodes, wherein the connection control block is stored in a local memory on the first node;
    build a packet in a format of a connection and communication protocol using the data, the destination logical node identifier, and a logical node identifier for the first node, wherein the logical node identifier for the first node is included in the connection control block entry;
    add, to the packet, a header that includes a switch fabric address for the second node, wherein the switch fabric address is identified in the located entry of the connection control block; and
    transmit the packet on a link to the switch fabric.

9. The distributed memory logic circuit of in claim 8, wherein the distributed shared memory system is a cache coherent non-uniform memory access system.

10. The distributed memory logic circuit of claim 8, wherein the distributed memory logic circuit of the first node sets the destination logical node identifier to zero if the destination logical node identifier in the physical memory address equals the logical node identifier for the first node.

11. A distributed memory logic circuit encoded with executable logic, the logic when executed operable to:
    receive, at the distributed memory logic circuit of a first node, a packet from a distributed memory logic circuit of a second node, wherein the packet includes a source logical node identifier and wherein the first and second nodes are connected by a network switch fabric and are parts of a distributed shared memory system;
    determine whether a destination switch fabric address included in the packet matches a switch fabric address for the first node;
    use the source logical node identifier as an index into a connection control block to locate an entry for a connection between the first and second nodes, wherein the connection control block is stored in a local memory on the first node;
    determine whether a destination logical node identifier included in the packet matches a logical node identifier for the first node, wherein the logical node identifier for the first node is identified in the located entry of the connection control block; and
    accept data in the packet for further processing by the first node.

12. The distributed memory logic circuit of claim 11, wherein the packet is discarded if the destination switch fabric address included in the packet does not match the switch fabric address for the first node.

13. The distributed memory logic circuit of claim 11, wherein the packet is discarded if the destination logical node identifier does not match the logical node identifier for the first node identified in the located entry of the connection control block.

14. The distributed memory logic circuit of claim 11, wherein the distributed shared memory system is a cache coherent non-uniform memory access system.

15. A system comprising:
    two or more nodes in a distributed shared memory system connected by a network switch fabric; and wherein each of the two or more nodes comprises one or more processors, local memory and a distributed memory logic circuit,
    wherein the distributed memory logic circuit is encoded with executable logic, the logic
    when executed operable to
    receive, at the distributed memory logic circuit of a local node, data for a packet destined to a distributed memory logic circuit of a remote node of the two or more nodes in the distributed shared memory system, wherein the data for the packet includes a physical memory address in which one or more bits in the address comprise a destination logical node identifier for the remote node,
    use the destination logical node identifier as an index into a connection control block to locate an entry for a connection between the local and remote node, wherein the connection control block is stored in local memory on the local node,
    build a packet a format of a connection and communication protocol using the data, the destination logical node identifier, and a logical node identifier for the local node, wherein the logical node identifier for the local node is included in the connection control block entry,
    add, to the packet, a header that includes a switch fabric address for the remote node, wherein the switch fabric address is identified in the located entry of the connection control block,
    transmit the packet on a link to the network switch fabric,
    receive, at the distributed memory logic circuit of the local node, a second packet from a distributed memory logic circuit of the remote node or another remote node of the two or more nodes in the distributed shared memory system, wherein the second packet includes a source logical node identifier,
    determine whether a destination switch fabric address included in the second packet matches a switch fabric address for the local node,
    use the source logical node identifier as an index into the connection control block to locate an entry for a connection between the local and remote node, determine whether a destination logical node identifier included in the second packet matches a logical node identifier for the local node, wherein the logical node identifier for the local node is identified in the located entry of the connection control block, and
    accept data in the packet for further processing by the local node.

* * * * *